US012682278B2

(12) United States Patent
Kang et al.

(10) Patent No.: US 12,682,278 B2
(45) Date of Patent: Jul. 14, 2026

(54) METHOD, APPARATUS, AND COMPUTER PROGRAM FOR CREATING STANDARDIZED BRAINWAVE IMAGE FOR TRAINING ARTIFICIAL INTELLIGENCE MODEL

(71) Applicant: IMEDISYNC, INC., Seoul (KR)

(72) Inventors: Seung Wan Kang, Seoul (KR); Ukeob Park, Seoul (KR); Tae-gyun Jeong, Seoul (KR)

(73) Assignee: IMEDISYNC, INC., Seoul (KR)

( * ) Notice: Subject to any disclaimer, the term of this patent is extended or adjusted under 35 U.S.C. 154(b) by 1084 days.

(21) Appl. No.: 17/680,175

(22) Filed: Feb. 24, 2022

(65) Prior Publication Data

US 2022/0374771 A1    Nov. 24, 2022

(30) Foreign Application Priority Data

May 18, 2021    (KR) ........................ 10-2021-0063879
Jun. 2, 2021    (KR) ........................ 10-2021-0071393

(51) Int. Cl.
*G06N 20/00* (2019.01)
(52) U.S. Cl.
CPC .................................... *G06N 20/00* (2019.01)
(58) Field of Classification Search
CPC ...................................................... G06N 20/00
See application file for complete search history.

(56) References Cited

U.S. PATENT DOCUMENTS 9,747,421 B2 *    8/2017    Krishna ................. A61B 5/374
12,115,024 B2 *    10/2024    Di Ianni .............. A61B 8/5223

FOREIGN PATENT DOCUMENTS

JP        2019-162237 A      9/2019
KR        20190059376        5/2019
KR        10-2197112 B1      12/2020
KR        10-2022-0011573 A  1/2022

OTHER PUBLICATIONS

Thatcher et al., "Spatial-temporal current source correlations and cortical connectivity." Clinical EEG and Neuroscience 38.1 (Year: 2007).*
Farzan et al., "Standardization of electroencephalography for multi-site, multi-platform and multi-investigator studies: insights from the Canadian biomarker integration network in depression," Scientific Reports, Aug. 7, 2017, 11 pages.
(Continued)

*Primary Examiner* — Adam C Standke
(74) *Attorney, Agent, or Firm* — Fish & Richardson P.C.

(57) ABSTRACT

Provided are a method, apparatus, and computer program for creating a standardized brainwave image for training an artificial intelligence model. The method of creating a standardized brainwave image for training an artificial intelligence model executed by a computing device according to various embodiments of the present invention includes collecting a plurality of brainwave signals of a user, processing the plurality of collected brainwave signals, and creating a brainwave image using the plurality of processed brainwave signals.

9 Claims, 14 Drawing Sheets
(3 of 14 Drawing Sheet(s) Filed in Color)

(56) References Cited

OTHER PUBLICATIONS

Li et al., "A novel MI-EEG imaging with the location information of electrodes," IEEE Access, Jan. 7, 2020, 8:3197-3211.
Uktveris et al., "Application of Convolutional Neural Networks to Four-Class Motor Imagery Classification Problem," Information Technology and Control, Jun. 2017, 46(2):260-273.
International Search Report and Written Opinion in International Appln. No. PCT/KR2022/002655, mailed on Jun. 3, 2022, 16 pages (with English Translation).

* cited by examiner

PIXEL
VALUE
ACCORDING
TO
POSITION
OF REGION
OF
INTEREST

TIME

PIXEL VALUE ACCORDING TO
CHANGE IN FREQUENCY

FIG. 9

| 1 | | 8 | 10 | | | | | | | 45 | Hz |

| 1 | | | | | | | | | 45 | Hz |

Delta        Theta        Alpha1        Alpha2        Beta1        Beta2        Beta3        Gamma
(1~4Hz)    (4~8Hz)    (8~10Hz)    (10~12Hz) (12~15Hz)(15~20Hz) (20~30Hz) (30~45Hz)

FIG. 10A
FIG. 10B
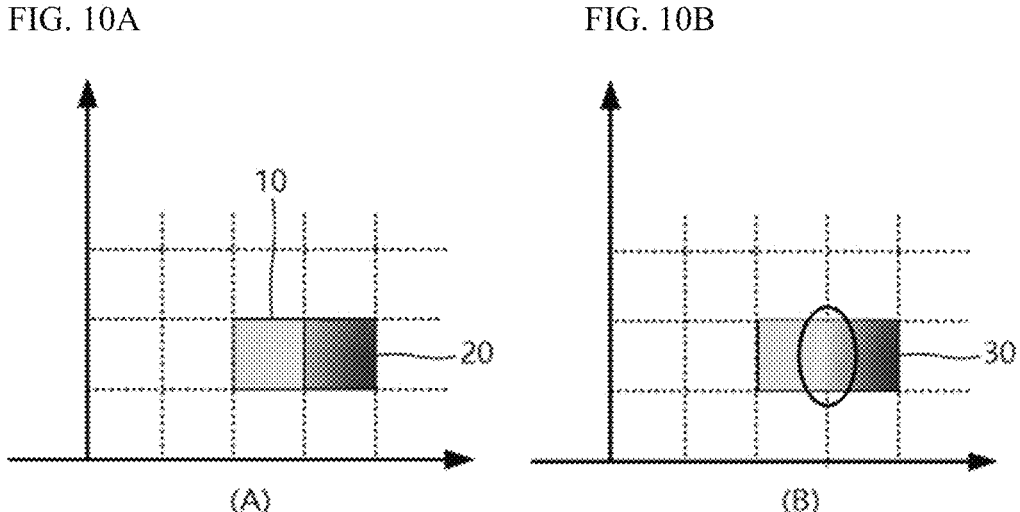
(A)
(B)
FIG. 11A
FIG. 11B
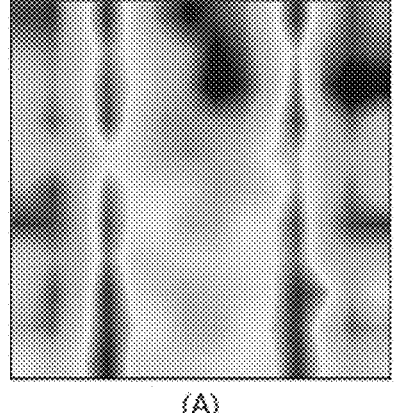
(A)
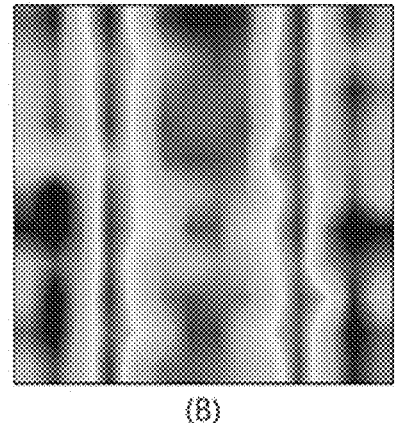
(B)

FIG. 12A
FIG. 12B
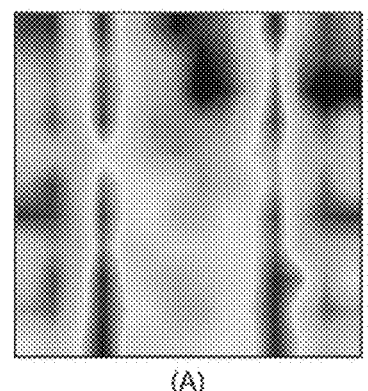
(A)
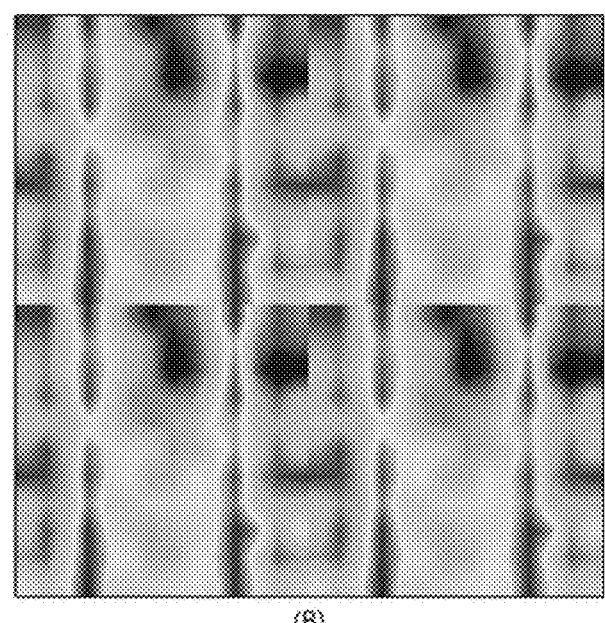
(B)

PIXEL VALUE ACCORDING TO POSITION OF REGION OF INTEREST

FREQUENCY

PIXEL VALUE ACCORDING TO
POSITION OF REGION OF INTEREST

METHOD, APPARATUS, AND COMPUTER PROGRAM FOR CREATING STANDARDIZED BRAINWAVE IMAGE FOR TRAINING ARTIFICIAL INTELLIGENCE MODEL

CROSS-REFERENCE TO RELATED APPLICATION

This application claims priority to and the benefit of Korean Patent Application No. 10-2021-0063879, filed on May 18, 2021 and Korean Patent Application No. 10-2021-0071393, filed on Jun. 2, 2021, the disclosure of which is incorporated herein by reference in its entirety.

BACKGROUND

1. Field of the Invention

Various embodiments of the present invention relate to a method, apparatus, and computer program for creating a standardized brainwave image for training an artificial intelligence model, and more particularly, to a method of creating a standardized brainwave image as training data for improving accuracy, sensitivity and specificity of an artificial intelligence model that analyzes an imaged brainwave signal.

2. Discussion of Related Art

Brainwaves are a flow of electricity generated when signals are transmitted between cranial nerves in a nervous system, and appear differently depending on a physical and mental state. A state of a person may be determined by measuring and analyzing an activity state of the brain in the form of a signal. From brainwaves, it may be determined whether there is a disease in the brain as well as a physical and mental state of the person. Therefore, technologies for analyzing and reading brainwaves are being actively developed.

A typical brainwave test involves measuring spontaneous electrical activity generated by activity of neurons in the brain through electrodes attached to various parts of the scalp over a period of time by non-invasive methods, and in special cases, uses invasive methods (for example, electrocorticography). In general, diagnosis using brainwaves is performed by focusing on spectral information of the brainwaves. In this case, a frequency type of a brainwave signal is used.

However, in the case of such a typical brainwave test, there is a problem in that it is difficult to distinguish even minute differences in brainwaves. In order to overcome this problem, with the recent development of computer technology, software capable of analyzing brainwaves is being further improved and developed.

Conventionally, a method of analyzing brainwaves of a user has been developed and utilized using a pre-trained machine-learning-based artificial intelligence model using training data generated by imaging brainwaves. In particular, as the training data for training an artificial intelligence model, a topographic map (topomap) (for example, FIG. 1) of brainwaves generated by imaging the brainwaves has been used.

A topographic map of brainwaves is an appropriate type of data for experts such as doctors to estimate a patient's condition and make a diagnosis. As illustrated in FIG. 1, since data for edge portions of images is ambiguous, there is a problem that it is inappropriate for training an artificial intelligence model. In fact, it has been confirmed that an artificial intelligence model trained using a topographic map of brainwaves as the training data has problems of poor performance such as a decrease in accuracy.

For the purpose of solving the above problems, Prior Document 1 (Korean Patent Registration No. 10-2151497) discloses a configuration for generating an image map for training an artificial intelligence model based on brainwave information, and Prior Document 2 (Korean Patent Registration No. 10-1748731) discloses a configuration for creating a brainwave image using a brainwave signal.

However, in the configuration disclosed in Prior Document 1, since an image map is generated by selectively considering only a brainwave signal in a specific frequency band in order to improve performance of an operation of identifying a specific brain disease, there is a problem in that it is difficult to analyze brainwave signals in all frequency bands with only one image map, and since each axis of the image map is simply composed of positions of left and right channels that measure brainwave signals, there is a problem in that it is difficult to observe a change in the brainwave signals according to a change in a frequency band.

In addition, the configuration disclosed in Prior Document 2 is a configuration that creates a brainwave image in a form in which an eigenface technology is applicable, for the purpose of classifying brainwaves using the eigenface technology instead of training an artificial intelligence model. Even if an artificial intelligence model is trained using this configuration, there is a problem in that it is difficult to consider the importance of each frequency band.

SUMMARY OF THE INVENTION

The present invention is directed to a method, apparatus, and computer program for creating a standardized brainwave image for training an artificial intelligence model that are capable of comparing brainwave signals collected through left and right channels with only one standardized brainwave image, analyzing brainwave signals in all frequency bands, and analyzing the brainwave signals in consideration of the importance of each frequency band by creating standardized brainwave images using a plurality of brainwave signals collected from a user and training a machine-learning-based artificial intelligence model using the generated standardized brainwave images to improve performance (for example, accuracy, sensitivity, specificity, etc., of modeling) of the machine-learning-based artificial intelligence model for analyzing brainwaves.

Objects of the present invention are not limited to the objects described above, and other objects that are not described may be obviously understood by those skilled in the art from the following description.

According to an aspect of the present invention, there is provided a method of creating a standardized brainwave image for training an artificial intelligence model executed by a computing device, the method including: collecting a plurality of brainwave signals of a user; processing the plurality of collected brainwave signals; and creating a brainwave image using the plurality of processed brainwave signals.

The collecting of the plurality of brainwave signals may include collecting a plurality of brainwave signals in different frequency bands through a plurality of brainwave measurement channels attached to different positions of a user's head.

The processing of the plurality of collected brainwave signals may include: calculating index values for each of the plurality of collected brainwave signals; filtering a brainwave signal in a specific frequency band among the plurality of brainwave signals for which the index values are calculated by preprocessing the plurality of brainwave signals from which the index values are calculated; and determining pixel values corresponding to each of the plurality of preprocessed brainwave signals by using the calculated index values, and the creating of the brainwave image may include creating the brainwave image by using the determined pixel values.

The calculating of the index values may include calculating the index value using at least one of absolute power, relative power, a standard value (Z-score), complexity, and entropy of each of the plurality of preprocessed brainwave signals.

The creating of the brainwave image by using the determined pixel values may include creating the brainwave image by arranging the pixel values determined for each of the plurality of preprocessed brainwave signals on a preset template, and in the preset template, pixel values according to a change in frequency may be arranged on a first axis, and pixel values according to a change in position of a region of interest of a user's brain may be arranged on a second axis in a direction perpendicular to the first axis, and by setting a preset reference frequency value as a central axis of the first axis, pixel values corresponding to brainwave signals collected from a left region of the brain may be arranged in a left region with respect to the central axis, and pixel values corresponding to brainwave signals collected from a right region of the brain may be arranged in a right region with respect to the central axis.

The creating of the brainwave image by arranging the determined pixel values on the preset template may include dividing each of left and right sides of the first axis for each frequency band according to a type of the brainwave signals based on the central axis to generate a plurality of unit sections, and dividing the first axis so that the plurality of unit sections have the same length regardless of a range of the frequency band according to the type of the brainwave signals.

The dividing of the first axis may include: upon receiving a request from the user to extend a length of a first unit section among the plurality of generated unit sections, extending the length of the first unit section, and equally shortening lengths of the remaining unit sections by the extended length of the first unit section; and upon receiving a request from the user to shorten a length of a second unit section among the plurality of generated unit sections, shortening the length of the second unit section and equally extending the remaining unit sections by the shortened length of the second unit section.

The creating of the brainwave image by arranging the determined pixel values on the preset template may include dividing the first axis for each frequency band according to the type of the brainwave signals to generate a plurality of unit sections, and determining a length of each of the plurality of unit sections based on the importance of each frequency band input by the user.

The creating of the brainwave image by arranging the determined pixel values on the preset template may include generating a pixel value matrix using the plurality of pixel values determined to correspond to each of the plurality of preprocessed brainwave signals, the generated pixel value matrix having pixel values according to a change in frequency of the plurality of preprocessed brainwave signals arranged in a row direction and pixel values according to a change in a position of a region of interest of the plurality of preprocessed brainwave signals arranged in a column direction; converting the generated pixel value matrix into a square matrix based on a row or column; and arranging the pixel value matrix converted into the square matrix on the preset template to generate a standardized brainwave image.

The creating of the brainwave image by arranging the determined pixel values on the preset template may include arranging the plurality of pixel values determined to correspond to each of the plurality of preprocessed brainwave signals in a region corresponding to a frequency and a position of a point of interest of each of the plurality of preprocessed brainwave signals on the preset template, and performing image smoothing with pixel values arranged at mutually adjacent positions with respect to each of the plurality of pixel values; and creating a standardized brainwave image by performing image resizing of changing the image-smoothed brainwave image to a square of a preset size.

The method may further include: generating training data for training the artificial intelligence model by using the generated brainwave image, wherein the generated training data includes one standardized brainwave image, or a plurality of standardized brainwave images combined in a square shape.

According to another aspect of the present invention, there is provided an apparatus for creating a standardized brainwave image for training an artificial intelligence model, the apparatus including: a processor; a network interface; a memory; and a computer program loaded into the memory and executed by the processor, in which the computer program includes an instruction for collecting a plurality of brainwave signals of a user; an instruction for processing the plurality of collected brainwave signals; and an instruction for creating a brainwave image using the plurality of processed brainwave signals.

According to still another aspect of the present invention, there is provided a computer program recorded on a computer-readable recording medium, in which the computer program executes, in combination with a computing device: collecting a plurality of brainwave signals of a user; processing the plurality of collected brainwave signals; and creating a brainwave image using the plurality of processed brainwave signals.

Other specific details of the present invention are included in the detailed description and drawings.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The above and other objects, features and advantages of the present invention will become more apparent to those of ordinary skill in the art by describing in detail exemplary embodiments thereof with reference to the accompanying drawings, in which:

FIG. 9 is a diagram illustrating a process of dividing a first axis according to a frequency band according to various embodiments;

FIGS. 10A and 10B are diagrams illustrating a process of performing image smoothing between pixel values according to various embodiments;

FIGS. 11A and 11B are diagrams exemplarily illustrating a standardized brainwave image according to various embodiments;

FIGS. 12A and 12B are diagrams exemplarily illustrating training data for training an artificial intelligence model according to various embodiments.

DETAILED DESCRIPTION OF EXEMPLARY EMBODIMENTS

Figure 1:
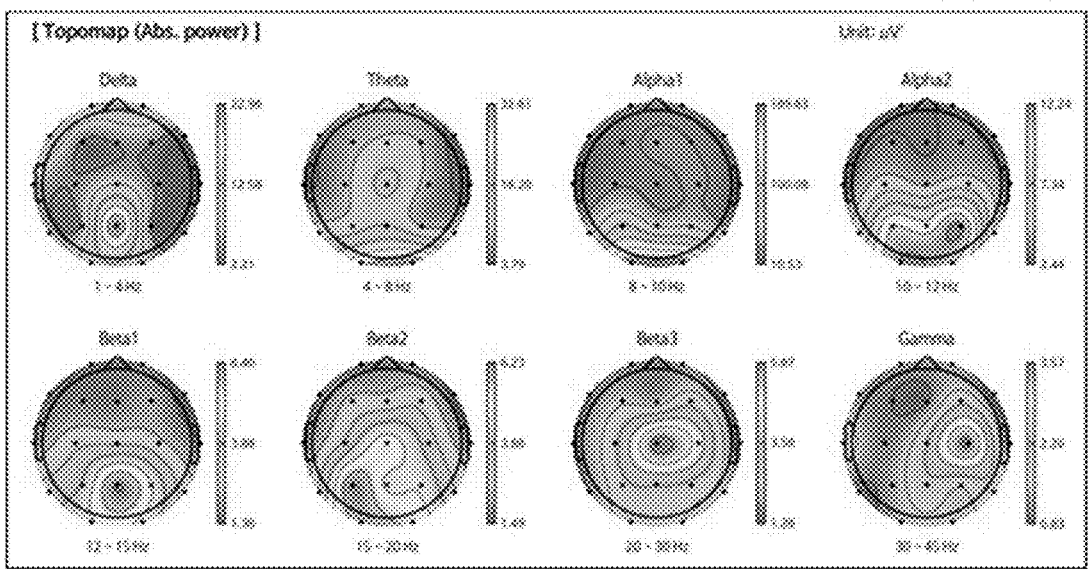
FIG. 1 shows diagrams illustrating a topographic map of brainwaves used for training a conventional artificial intelligence model.

Various advantages and features of the present invention and methods of accomplishing them will become apparent from the following description of embodiments with reference to the accompanying drawings. However, the present invention is not limited to the exemplary embodiments to be described below, but may be implemented in various different forms, these exemplary embodiments will be provided only in order to make the present invention complete and allow those skilled in the art to completely recognize the scope of the present invention, and the present invention will be defined by the scope of the claims.

Terms used in the present specification are for explaining embodiments rather than limiting the present invention. Unless otherwise stated, a singular form includes a plural form in the present specification. Throughout this specification, the term "comprise" and/or "comprising" will be understood to imply the inclusion of stated constituents but not the exclusion of other constituents. Like reference numerals refer to like components throughout the specification and "and/or" includes each of the components described and includes all combinations thereof. Although "first," "second" and the like are used to describe various components, it goes without saying that these components are not limited by these terms. These terms are used only to distinguish one component from other components. Therefore, it goes without saying that a first component described below may be a second component within the technical scope of the present invention.

Unless defined otherwise, all terms (including technical and scientific terms) used in the present specification have the same meanings commonly understood by those skilled in the art to which the present invention pertains. In addition, terms defined in commonly used dictionary are not ideally or excessively interpreted unless explicitly defined otherwise.

Further, the term "unit" or "module" used herein refers to a hardware component such as software, a field programmable gate array (FPGA), or an application specific integrated circuit (ASIC) that performs predetermined functions. However, the term "unit" or "module" is not meant to be limited to software or hardware. The term "unit" or "module" may be configured to be stored in a storage medium that can be addressed or may be configured to regenerate one or more processors. Accordingly, for example, "units" or "modules" include components such as software components, object-oriented software components, class components, and task components, processors, functions, attributes, procedures, subroutines, segments of a program code, drivers, firmware, a microcode, a circuit, data, a database, data structures, tables, arrays, and variables. Components and functions provided within a "unit" or "module" may be combined into a smaller number of components and a "unit" or "module" or may be further separated into additional components and "units" or "modules."

Spatially relative terms "below," "beneath," "lower," "above," "upper," and the like may be used to easily describe the correlation between one component and other components as illustrated in drawings. The spatially relative terms should be understood as terms including different directions of components during use or operation in addition to the directions illustrated in the drawings. For example, if components illustrated in drawings are turned over, components described as "below" or "beneath" another component may be placed "above" the other components. Therefore, the illustrative term "below" can include both downward and upward directions. The components can also be aligned in different directions, and therefore the spatially relative terms can be interpreted according to the alignment.

In this specification, the computer may be any kind of hardware device including at least one processor, and may be understood as including a software configuration which is operated in the corresponding hardware device according to the embodiment. For example, the computer may be understood to be any of a smart phone, a tablet personal computer (PC), a desktop, a notebook, or a user client or application running on any of these devices, but is not limited thereto.

Hereinafter, embodiments of the present invention will be described in detail with reference to the accompanying drawings.

Each step described in the present specification is described as being performed by a computer, but subjects of each step are not limited thereto, and according to embodiments, at least some of the steps can also be performed on different devices.

Figure 2:
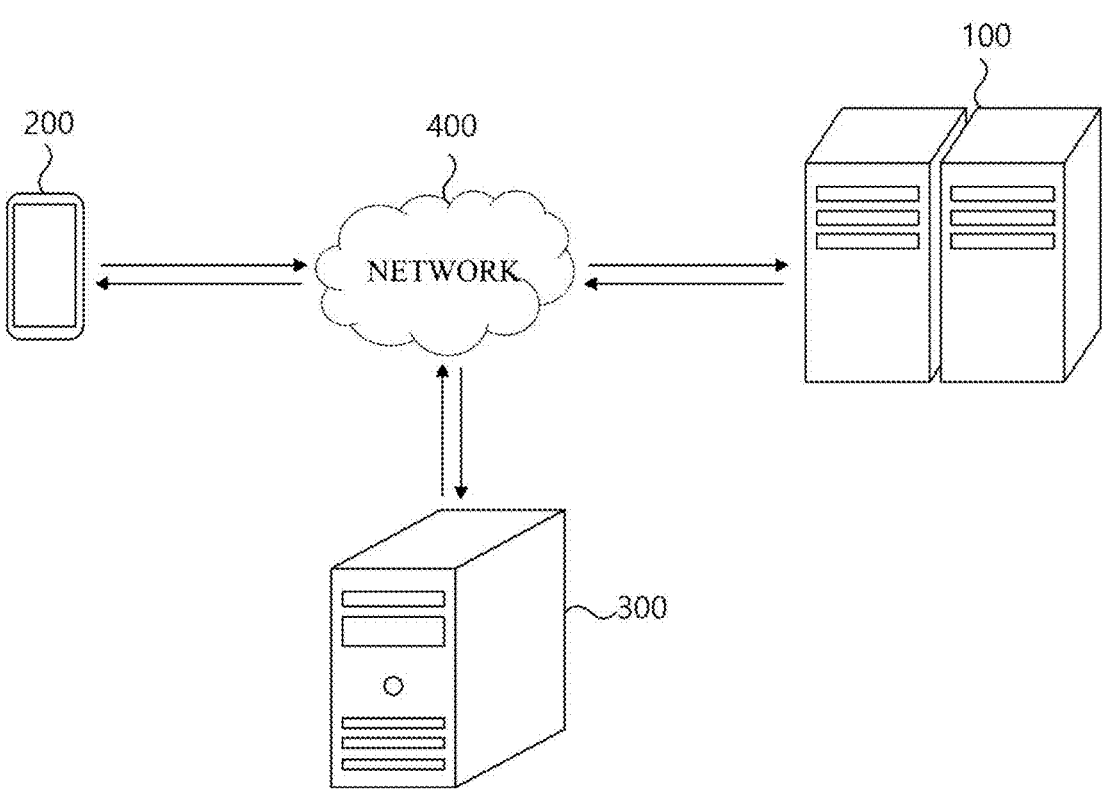
FIG. 2 is a diagram illustrating a system for creating a standardized brainwave image for training an artificial intelligence model according to an embodiment of the present invention.

FIG. 2 is a diagram illustrating a system for creating a standardized brainwave image for training an artificial intelligence model according to an embodiment of the present invention.

Referring to FIG. 2, the system for creating a standardized brainwave image for training an artificial intelligence model according to the embodiment of the present invention may include an apparatus 100 for creating a standardized brainwave image, a user terminal 200, and an external server 300.

Here, the system for creating a standardized brainwave image for training an artificial intelligence model illustrated in FIG. 1 is based on an embodiment, and components of the system are not limited to the embodiment illustrated in FIG. 1, and may be added, changed, or removed as necessary.

In an embodiment, the apparatus 100 for creating a standardized brainwave image may create a standardized brainwave image as training data for training an artificial intelligence model (for example, an image analysis model that uses a brainwave image created by imaging a brainwave signal as input data and outputs result data related to state information of a user) by using a plurality of brainwave signals collected from a user.

For example, the apparatus 100 for creating a standardized brainwave image processes a plurality of brainwave signals collected from a user, converts the plurality of processed brainwave signals into pixel values, and arranges the converted pixel values on a preset template, thereby creating a brainwave image.

In addition, the apparatus 100 for creating a standardized brainwave image may generate a standardized brainwave image for training (for example, image smoothing and image resizing) an artificial intelligence model by processing the brainwave image created by the above process, thereby creating a standardized brainwave image for training the artificial intelligence model.

In various embodiments, the apparatus 100 for creating a standardized brainwave image may be connected to a brainwave measurement device (not illustrated) through a network 400, and may collect the plurality of brainwave signals collected through the brainwave measurement device.

Here, the network 400 may be a connection structure capable of exchanging information between respective nodes such as a plurality of terminals and servers. For example, the network 400 may be a local area network (LAN), a wide area network (WAN), the Internet (world wide web (WWW)), a wired/wireless data communication network, a telephone network, a wired/wireless television communication network, or the like.

In addition, here, the wireless data communication network may be 3G, 4G, 5G, $3^{rd}$ Generation Partnership Project (3GPP), $5^{th}$ Generation Partnership Project (5GPP), Long Term Evolution (LTE), World Interoperability for Microwave Access (WIMAX), wireless fidelity (Wi-Fi), the Internet, a local area network (LAN), a wireless local area network (Wireless LAN), a wide area network (WAN), a personal area network (PAN), radio frequency (RF), a Bluetooth network, a near-field communication (NFC) network, a satellite broadcast network, an analog broadcast network, a digital multimedia broadcasting (DMB) network, or the like, but is not limited thereto.

In various embodiments, the apparatus 100 for creating a standardized brainwave image may generate training data using the standardized brainwave image created according to the above method, and may train the artificial intelligence model using the generated training data.

Here, the artificial intelligence model is composed of one or more network functions, and the one or more network functions may be composed of a set of interconnected computational units, which may be generally referred to as "nodes." These "nodes" may also be referred to as "neurons." One or more network functions are configured by including at least one or more nodes. The nodes (or neurons) constituting one or more network functions may be interconnected by one or more "links."

In the artificial intelligence model, one or more nodes connected through a link may relatively form a relationship between an input node and an output node. The concepts of the input node and the output node are relative. Any node that has the relationship of an output node with respect to one node may have the relationship of an input node with respect to other nodes, and vice versa. As described above, the relationship of an input node to an output node may be generated around the links. One or more output nodes may be connected to one or more input nodes through the links, and vice versa.

In the relationship between the input node and the output node connected through one link, a value of the output node may be determined based on data input to the input node. Here, a node interconnecting the input node and the output node may have a weight. The weight may be variable, and may be changed by a user or an algorithm in order for the artificial intelligence model to perform a desired function. For example, when one or more input nodes are interconnected to one or more output nodes by respective links, the output node may determine output node values based on values input to input nodes connected to the output node and weights set in links corresponding to each input node.

As described above, regarding the artificial intelligence model, one or more nodes are interconnected through one or more links to form the relationship of the input node and the output node within the artificial intelligence model. The characteristics of the artificial intelligence model may be determined according to the number of nodes and links in the artificial intelligence model, the correlation between the nodes and links, and values of weights assigned to each of the links. For example, when the same number of nodes and links exist and there are two artificial intelligence models having different values of weights between the links, the two artificial intelligence models may be recognized as being different from each other.

Some of the nodes constituting the artificial intelligence model may constitute one layer based on distances from an initial input node. For example, a set of nodes having a distance n from the initial input node may constitute n layers. The distance from the initial input node may be defined by the minimum number of links passed to reach the corresponding node from the initial input node. However, the definition of such a layer is arbitrary for explanation, and the order of the layers in the artificial intelligence model may be defined in a different way. For example, the layers of nodes may be defined by a distance from the final output node.

The initial input node may be one or more nodes to which data is directly input without passing through a link in the relationship with other nodes among nodes in the artificial intelligence model. Alternatively, within the artificial intelligence model network, in the relationship between nodes based on a link, the initial input node may be a node that does not have other input nodes connected by the link. Similarly, a last output node may be one or more nodes that do not have an output node in the relationship with other nodes among nodes in the artificial intelligence model. In addition, a hidden node may be a node constituting the artificial intelligence model other than the initial input node and the last output node. The artificial intelligence model according to an embodiment of the present invention may be an artificial intelligence model having a form in which the number of nodes of an input layer is greater than that of the hidden layer close to an output layer, and the number of nodes decreases as the input layer progresses to the hidden layer.

The artificial intelligence model may contain one or more hidden layers. The hidden node of the hidden layer may receive an output of a previous layer and outputs of neighboring hidden nodes as inputs. The number of hidden nodes for each hidden layer may be the same or different. The number of nodes of the input layer may be determined based on the number of data fields of the input data and may be the same as or different from the number of hidden nodes. Input data input to the input layer may be calculated by a hidden node of the hidden layer and may be output by a fully connected layer (FCL) that is an output layer.

In addition, the apparatus 100 for creating a standardized brainwave image may train the artificial intelligence model using the standardized brainwave image. Specifically, the apparatus 100 for creating a standardized brainwave image may train one or more network functions constituting an artificial intelligence model using a labeled training data set. For example, the apparatus 100 for creating a standardized brainwave image may input each of the training input data sets to one or more network functions, and compare all of the output data calculated by the one or more network functions with each of the training output data sets corresponding to labels of each of the training input data sets, thereby deriving errors. That is, in the training of the artificial intelligence model, the training input data may be input to the input layer of one or more network functions, and the training output data may be compared with the outputs of one or more network functions. The apparatus 100 for creating a standardized brainwave image may train the artificial intelligence model based on an operation result of one or more network functions for the training input data and an error of the training output data (label).

In addition, the apparatus 100 for creating a standardized brainwave image may adjust the weights of one or more network functions in a backpropagation manner based on the error. That is, the apparatus 100 for creating a standardized brainwave image may adjust the weights so that the output of one or more network functions approaches the training output data based on the operation result of one or more network functions for the training input data and the error of the training output data.

The apparatus 100 for creating a standardized brainwave image may determine whether to stop training by using validation data when the training of one or more network functions is performed over a predetermined epoch. The predetermined epoch may be a part of the overall training objective epoch. The validation data may be composed of at least a portion of the labeled training data set. That is, the apparatus 100 for creating a standardized brainwave image may train the artificial intelligence model through the training data set, and after the training of artificial intelligence model is repeated over the predetermined epoch, may determine whether the training effect of the artificial intelligence model using the validation data is more than a predetermined level. For example, when performing training with the target repetition learning number corresponding to 10 times using 100 pieces of training data, the apparatus 100 for creating a standardized brainwave image may perform repetition learning 10 times which is the predetermined epoch, and then perform the repetition learning three times using 10 pieces of validation data to determine that it is meaningless to perform further learning when the change in the output of the artificial intelligence model while the repetition learning is performed three times is the predetermined level or less and terminate the learning. That is, the verification data may be used to determine the completion of the learning based on whether the training effect for each epoch is the predetermined level or more or less in the repetition learning of the artificial intelligence model. The above-described training data, the number of pieces of verification data and the number of repetitions are merely examples and are not limited thereto.

The apparatus 100 for creating a standardized brainwave image may test the performance of one or more network functions using a test data set to determine whether to activate one or more network functions, thereby generating the artificial intelligence model. The test data may be used to validate the performance of the artificial intelligence model, and may be composed of at least a part of the training data set. For example, 70% of the training data set may be used to train the artificial intelligence model (i.e., learning to adjust weights to output result values similar to labels), and 30% of the training data set may be used as test data for the validation of the performance of the artificial intelligence model.

The apparatus 100 for creating a standardized brainwave image may determine whether to activate the artificial intelligence model according to whether the performance of the artificial intelligence model is the predetermined level or more by inputting the test data set to the trained artificial intelligence model and measuring the error. The apparatus 100 for creating a standardized brainwave image may validate the performance of the trained artificial intelligence model by using the test data on the trained artificial intelligence model, and activate the artificial intelligence model so that the artificial intelligence model is used in other applications when the performance of the trained artificial intelligence model is the predetermined criterion or more.

In addition, the apparatus 100 for creating a standardized brainwave image may be discarded by inactivating the artificial intelligence model when the performance of the trained artificial intelligence model is the predetermined criterion or less. For example, the apparatus 100 for creating a standardized brainwave image may determine the performance of the artificial intelligence model generated based on factors such as accuracy, precision, and recall. The above-described performance evaluation criteria are merely examples and are not limited thereto. In addition, according to various embodiments of the present invention, the apparatus 100 for creating a standardized brainwave image may generate a plurality of artificial intelligence model models by independently training each artificial intelligence model, and use only the artificial intelligence model with certain performance or more for brainwave image analysis by evaluating the performance.

In an embodiment, the user terminal 200 may be connected to the apparatus 100 for creating a standardized brainwave image through the network 400, and the apparatus 100 for creating a standardized brainwave image may receive a standardized brainwave image created by performing a process of creating the standardized brainwave image for training the artificial intelligence model or receive the results of analyzing the plurality of brainwave signals through the artificial intelligence model trained using the standardized brainwave image.

Here, the user terminal 200 is a wireless communication apparatus in which portability and mobility are ensured, and examples thereof may include all types of handheld-based wireless communication devices such as navigators, personal communication systems (PCSs), Global System for Mobile Communications (GSM) devices, personal digital cellular (PDC) devices, personal handyphone systems (PHSs), personal digital assistants (PDAs), International Mobile Telecommunication (IMT)-2000 devices, code division multiple access (CDMA)-2000 devices, W-code division multiple access (W-CDMA) devices, wireless broadband Internet (WiBro) terminals, smartphones, smart pads, tablet PCs, and the like, but are not limited thereto.

In an embodiment, the external server 300 may be connected to the apparatus 100 for creating a standardized brainwave image through the network 400, and the apparatus 100 for creating a standardized brainwave image may collect and store various types of information and data required to perform the process of creating the standardized brainwave image for training the artificial intelligence model or collect and store various types of data generated by performing the process of generating the standardized brainwave image for training the artificial intelligence model. For example, the external server 300 may be a storage server separately provided outside the apparatus 100 for generating a standardized brainwave image, but is not limited thereto. Hereinafter, the hardware configuration of the apparatus 100 for creating a standardized brainwave image for performing the process of creating the standardized brainwave image for training the artificial intelligence model will be described with reference to FIG. 3.

Figure 3:
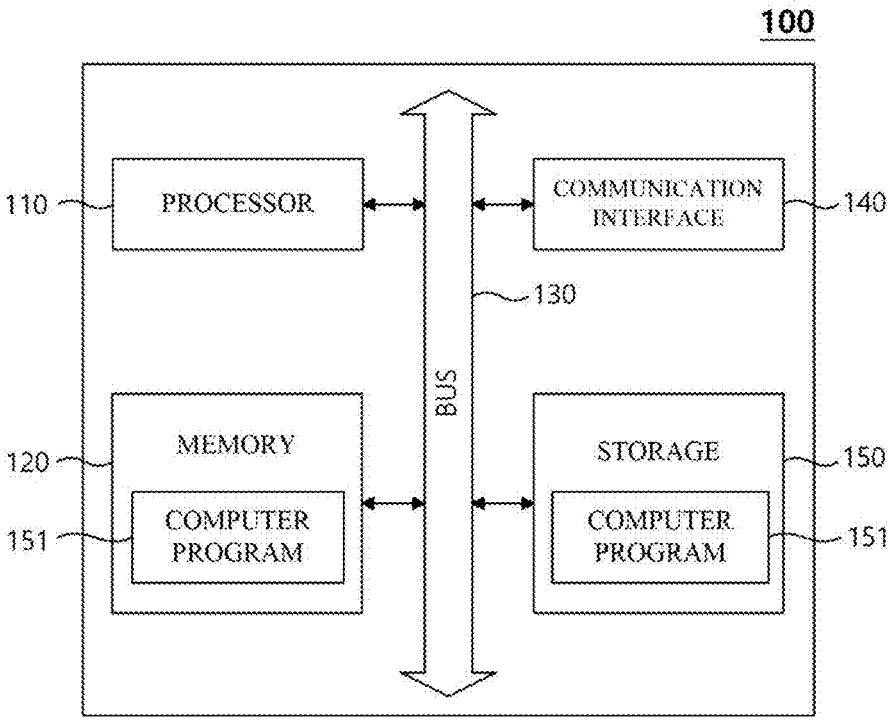
FIG. 3 is a hardware configuration diagram of an apparatus for creating a standardized brainwave image for training an artificial intelligence model according to another embodiment of the present invention.

FIG. 3 is a hardware configuration diagram of an apparatus for creating a standardized brainwave image for training an artificial intelligence model according to another embodiment of the present invention.

Referring to FIG. 3, the apparatus 100 for creating a standardized brainwave image (hereinafter, "computing device 100") according to another embodiment of the present invention may include one or more processors 110, a memory 120 into which a computer program 151 executed by the processor 110 is loaded, a bus 130, a communication interface 140, and a storage 150 for storing the computer program 151. Here, only the components related to the embodiment of the present invention are illustrated in FIG. 3. Accordingly, one of ordinary skill in the art to which the present invention pertains may understand that general-purpose components other than the components illustrated in FIG. 3 may be further included.

The processor 110 controls an overall operation of each configuration of the computing device 100. The processor 110 may include a central processing unit (CPU), a micro processor unit (MPU), a micro controller unit (MCU), a graphic processing unit (GPU), or any type of processor well known in the technical field of the present invention.

In addition, the processor 110 may perform an operation for at least one application or program for executing the method according to the embodiments of the present invention, and the computing device 100 may include one or more processors.

In various embodiments, the processor 110 may further include a random access memory (RAM) (not illustrated) and a read-only memory (ROM) for temporarily and/or permanently storing signals (or data) to be processed in the processor 110. In addition, the processor 110 may be implemented in the form of a system-on-chip (SoC) including at least one of a GPU, a RAM, and a ROM.

The memory 120 stores various types of data, commands and/or information. The memory 120 may load the computer program 151 from the storage 150 to execute methods/operations according to various embodiments of the present invention. When the computer program 151 is loaded into the memory 120, the processor 110 may perform the methods/operations by executing one or more instructions constituting the computer program 151. The memory 120 may be implemented as a volatile memory such as a RAM, but the technical scope of the present invention is not limited thereto.

The bus 130 provides a communication function between components of the computing device 100. The bus 130 may be implemented as any of various types of buses, such as an address bus, a data bus, or a control bus.

The communication interface 140 supports wired/wireless Internet communication of the computing device 100. In addition, the communication interface 140 may support various communication methods other than Internet communication. To this end, the communication interface 140 may include a communication module well known in the art. In some embodiments, the communication interface 140 may be omitted.

The storage 150 may non-temporarily store the computer program 151. When performing the process of creating the standardized brainwave image for training the artificial intelligence model through the computing device 100, the storage 150 may store various types of information necessary to provide the process of generating the standardized brainwave image for training the artificial intelligence model.

The storage 150 may include a nonvolatile memory, such as a ROM, an erasable programmable ROM (EPROM), an electrically erasable programmable ROM (EEPROM), or a flash memory, a hard disk, a removable disk, or any well-known computer-readable recording medium in the art to which the present invention belongs.

The computer program 151 may include one or more instructions that, when loaded into the memory 120, cause the processor 110 to perform the methods/operations according to various embodiments of the present invention. That is, the processor 110 may perform the methods/operations according to various embodiments of the present invention by executing the one or more instructions.

In an embodiment, the computer program 151 may include one or more instructions to perform the method of creating a standardized brainwave image for training an artificial intelligence model including collecting a plurality of brainwave signals of a user, processing the plurality of collected brainwave signals, and creating a brainwave image using the plurality of processed brainwave signals.

Steps of the method or algorithm described with reference to the embodiment of the present invention may be directly implemented in hardware, in software modules executed by hardware, or in a combination thereof. The software module may reside in a RAM, a ROM, an EPROM, an EEPROM, a flash memory, a hard disk, a removable disk, a compact disc (CD)-ROM, or in any form of computer readable recording medium known in the art to which the invention pertains.

The components of the present invention may be embodied as a program (or application) and stored in a medium for execution in combination with a computer which is hardware. The components of the present invention may be executed in software programming or software elements, and similarly, embodiments may be realized in a programming or scripting language such as C, C++, Java, or assembler, including various algorithms implemented in a combination of data structures, processes, routines, or other programming constructs. Functional aspects may be implemented with algorithms executed on one or more processors. Hereinafter, the process of creating the standardized brainwave image for training the artificial intelligence model performed by the computing device 100 will be described with reference to FIGS. 4 to 11.

Figure 4:
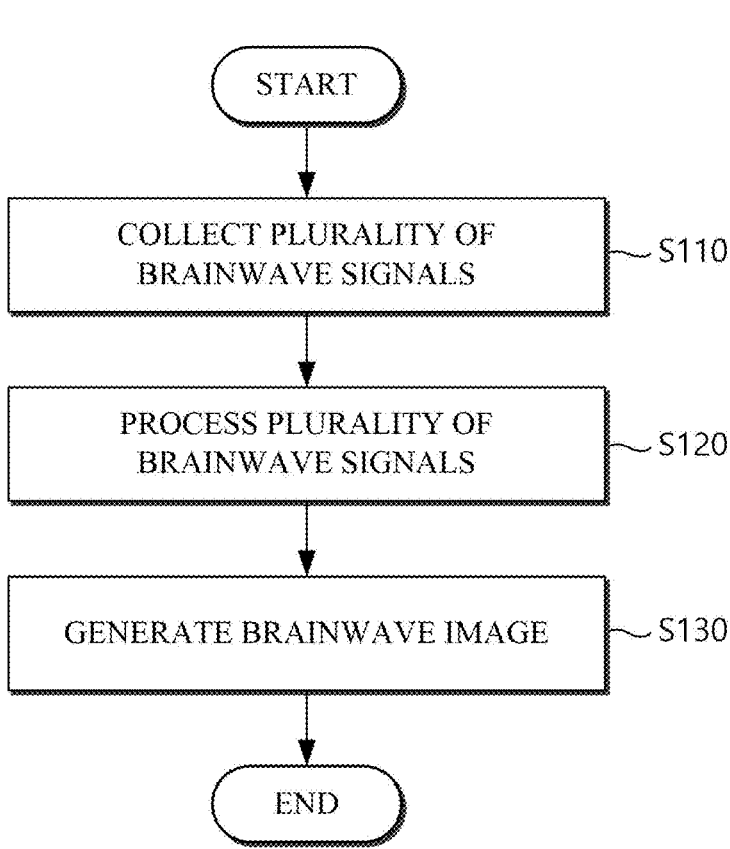
FIG. 4 is a flowchart of a method of creating a standardized brainwave image for training an artificial intelligence model according to still another embodiment of the present invention.

FIG. 4 is a flowchart of a method of creating a standardized brainwave image for training an artificial intelligence model according to another embodiment of the present invention.

Referring to FIG. 4, in operation S110, the computing device 100 may collect a plurality of brainwave signals of a first user (for example, a person whose brainwave signals are to be analyzed such as a patient). For example, the computing device 100 may collect a plurality of brainwave signals in different frequency bands through a brainwave measurement device (not illustrated) including a plurality of brain-wave measurement channels attached to different positions of the first user's head.

Here, the brainwave measurement device may be a device that may include a plurality of channels (2, 4, 8, 16, 19, 24, 68, 128, or 256 pieces, attached with caps or individual electrodes) attached to different positions of the first user's head and perform independent brainwave signal measurement through each channel according to the brainwave measurement system, and may receive the plurality of brainwave signals through each of the plurality of channels. For example, the brainwave measurement device may include 19 channels (for example, Fp1, Fp2, F3, F4, C3, C4, P3, P4, O1, O2, F7, F8, T3, T4, T5, T6, Fz, Cz, and Pz) (here, Fz, Cz, and Pz are common channels), and measure 19 independent brainwave signals through the 19 channels. However, the present invention is not limited thereto.

In various embodiments, the computing device 100 may collect a plurality of brainwave signals measured in a normal state in which the first user does not perform a separate operation through the brainwave measurement device, but is not limited thereto, and may collect the plurality of brainwave signals measured in the process of performing various operations or various tests.

In operation S120, the computing device 100 may process the plurality of brainwave signals of the first user collected through the brainwave measurement device. Hereinafter, a method of processing a plurality of brainwave signals performed by the computing device 100 will be described with reference to FIG. 5.

Figure 5:
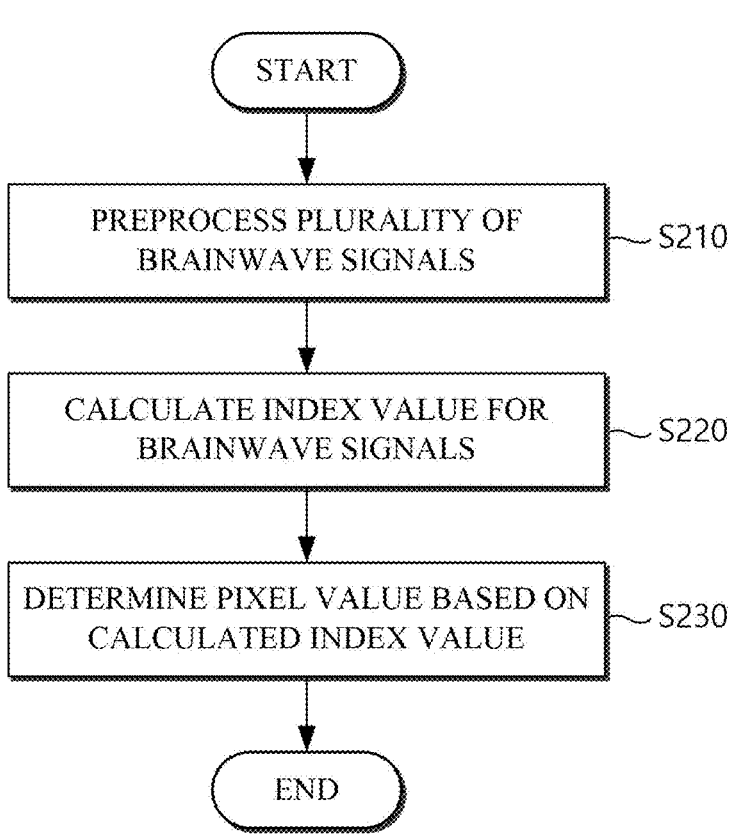
FIG. 5 is a flowchart of a method of processing a plurality of brainwave signals according to various embodiments.

FIG. 5 is a flowchart of a method of processing a plurality of brainwave signals according to various embodiments.

Referring to FIG. 5, in operation S210, the computing device 100 may preprocess the plurality of brainwave signals to filter a brainwave signal in a specific frequency band. For example, the computing device 100 may filter an unnecessary frequency band or frequency band (for example, a brainwave signal corresponding to a frequency band of less than 4 Hz and a brainwave signal corresponding to a frequency band exceeding 45 Hz) which may be vulnerable to noise among the plurality of brainwave signals to extract only the brainwave signal corresponding to the frequency band in a range of 1 to 45 Hz.

In various embodiments, when the brainwave signal (for example, a brainwave signal corresponding to any one of frequency bands of delta waves, alpha waves, beta waves, and gamma waves) in the specific frequency band is selected by a second user (for example, a person who wants to obtain the result of analyzing a brainwave signal such as a doctor, a manager of the process of creating the standardized brainwave image for training the artificial intelligence model, etc.), the computing device 100 may filter (or null process) brainwave signals corresponding to the frequency bands other than the brainwave signals of the specific frequency band selected by the second user.

In operation S220, the computing device 100 may use the plurality of brainwave signals (the result of filtering the brainwave signal corresponding to the specific frequency band) preprocessed in operation S210 to calculate index values for each of the plurality of preprocessed brainwave signals.

Here, the index values for each of the plurality of preprocessed brainwave signals may include at least one of absolute power, relative power, a standard value (Z-score), complexity, and entropy, but the present invention is not limited thereto.

First, the computing device 100 may calculate an index value using the absolute power of each of the plurality of brainwave signals. For example, the computing device 100 may calculate the sum of the power values (for example, the degree of appearance of each of the plurality of brainwave signals) of each of the plurality of preprocessed brainwave signals, thereby calculating the absolute power of each of the plurality of preprocessed brainwave signals. However, the present invention is not limited thereto, and various methods for calculating the absolute power of the brainwave signal may be applied.

In addition, the computing device 100 may calculate an index value using the relative power of each of the plurality of brainwave signals. For example, the computing device 100 may calculate a ratio (%) of a power value for each frequency of each of the plurality of preprocessed brainwave signals from the total sum of the power values of the plurality of preprocessed brainwave signals, thereby calculating the relative power of the plurality of preprocessed brainwave signals. For example, the computing device 100 may calculate the power value PSD for a specific frequency band and calculate the relative power based on the largest power value among the calculated values. However, the present invention is not limited thereto, and various methods for calculating the relative power of the brainwave signal may be applied.

In addition, the computing device 100 may calculate an index value using the relative power (Z core) (Z-score) for each of the plurality of brainwave signals. For example, the computing device 100 may normalize the plurality of preprocessed brainwave signals, and calculate a standard value (for example: (intensity of brainwave signal-standard deviation value of intensities of plurality of preprocessed brainwave signals)/(average value of intensities of plurality of preprocessed brainwave signals)) using a plurality of normally distributed brainwave signals. However, the present invention is not limited thereto, and various methods for calculating the standard value for the brainwave signal may be applied.

In addition, the computing device 100 may calculate an index value using the complexity and entropy of each of the plurality of brainwave signals. For example, the computing device 100 uses a method of calculating complexity using approximate entropy (for example, a method of strategically calculating for m sample sections whether the characteristics of the brainwave signal are maintained similarly in m+1 other sample sections), thereby calculating the complexity of each of the plurality of preprocessed brainwave signals. However, the present invention is not limited thereto, and various methods for calculating an absolute power of a brainwave signal may be applied.

In operation S230, the computing device 100 may use the index value calculated according to the above method to determine the pixel values corresponding to each of the plurality of preprocessed brainwave signals. Here, the method of determining a pixel value may include determining pixel values based on color data (for example, data in which pixel values of colors (for example, red, orange, yellow, green, blue, indigo, and purple) for each size of index values are matched and stored) for each size of index values), but is not limited thereto.

Referring back to FIG. 3, in operation S130, the computing device 100 may create a brainwave image using the pixel values determined by the above method.

In various embodiments, the computing device 100 may create a brainwave image by arranging the pixel values determined for each of a plurality of preprocessed brainwave signals on a preset template. Hereinafter, a method of generating a brainwave image performed by the computing device 100 will be described with reference to FIGS. 6 to 11.

Figure 6:
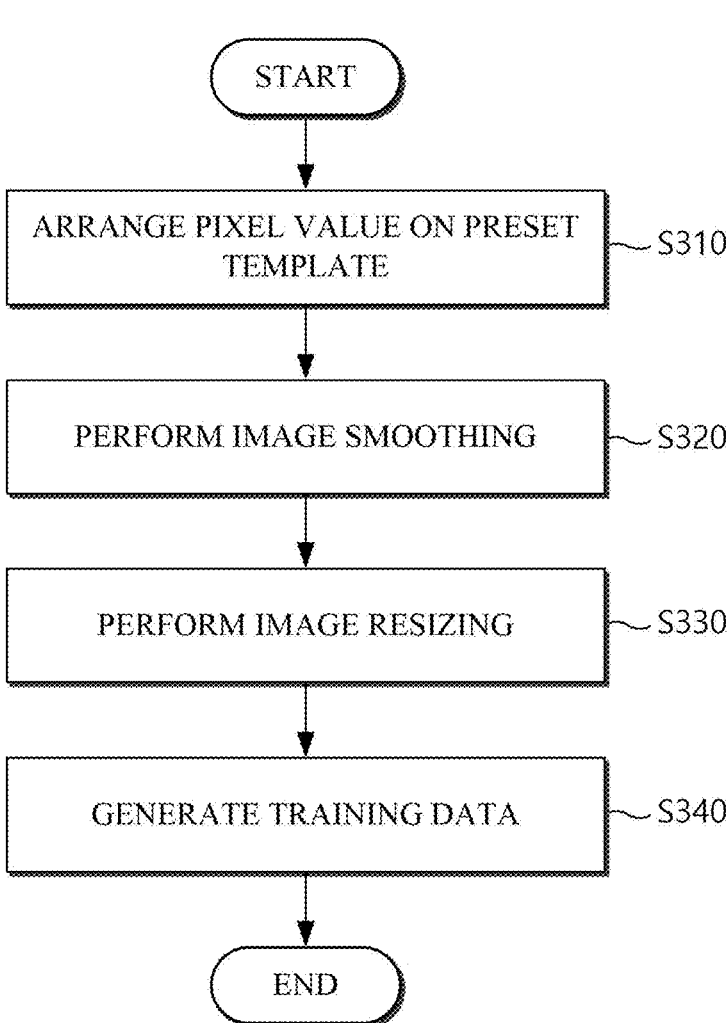
FIG. 6 is a flowchart of a method of creating a standardized brainwave image using a plurality of processed brainwave signals according to various embodiments.

FIG. 6 is a flowchart of a method of creating a standardized brainwave image using a plurality of processed brainwave signals according to various embodiments.

Referring to FIG. 6, in operation S310, the computing device 100 may arrange the pixel values determined for each of a plurality of preprocessed brainwave signals on the preset template.

Figure 7A:
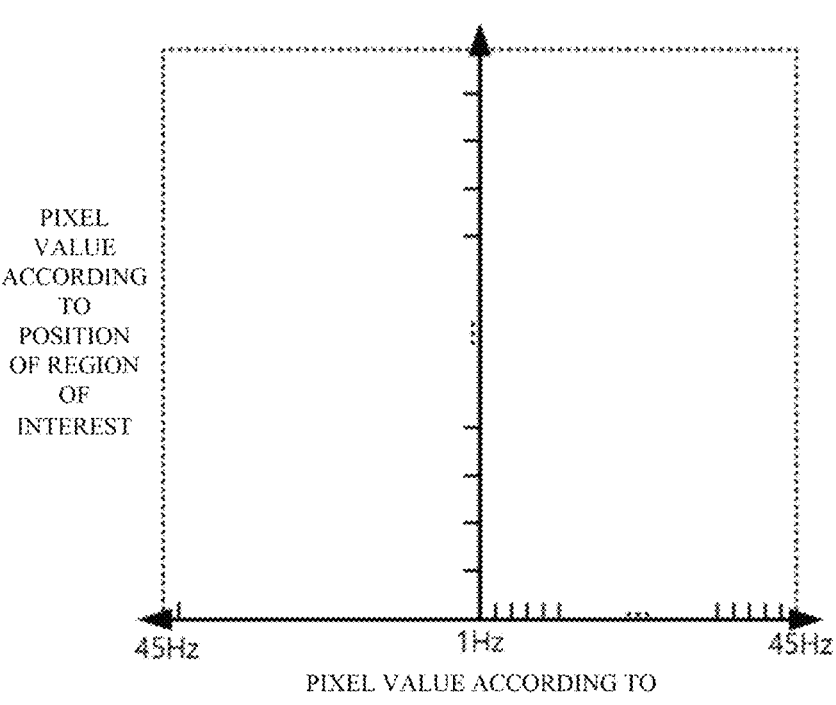
FIGS. 7A, 7B, 8A and 8B are diagrams illustrating a standardized brainwave image generation template applicable to various embodiments.

Here, as illustrated in FIG. 7A, in the preset template, pixel values according to a change in frequency may be arranged on a first axis (X-axis), and pixel values according to a change in a position of a region of interest (ROI) of a brain of a first user may be arranged on a second axis (Y-axis). However, the present invention is not limited thereto, and in the preset template, the pixel values according to the change in frequency may be arranged on the first axis, and the pixel values according to the positions of each of the plurality of brainwave measurement channels attached to the first user's head may be arranged on the second axis.

In addition, in the preset template, by setting a preset frequency value (for example, 1 Hz which is the lowest frequency value among the frequency values of the plurality of preprocessed brainwave signals), pixel values corresponding to brainwave signals collected from a left region of the brain may be arranged in the left region with respect to 1 Hz which is a central axis, and pixel values corresponding to brainwave signals collected from a right region of the brain may be arranged in the right region with respect to 1 Hz which is the central axis.

Here, the first axis may be divided into a preset unit frequency size (for example, 0.25 Hz), and the second axis may be divided according to the number of ROIs (for example, a total of 34 ROIs based on Desikan-Killiany atlas regions (for example, banks-STS, caudal-anterior-cingulate, caudal-middle-frontal, cuneus, entorhinal, frontal-pole, fusiform, inferior-parietal, inferior-temporal, insula, isthmus-cingulate, lateral-occipital, lateral-orbitofrontal, lingual, medial-orbitofrontal, middle-temporal, paracentral, parahippocampal, pars-opercularis, pars-orbitalis, pars-triangularis, pericalcarine, post-central, posterior-cingulate, precentral, precuneus, rostral-anterior-cingulate, rostral-middle-frontal, superior-frontal, superior-parietal, superior-temporal, supramarginal, temporal-pole and transverse-temporal)).

That is, the preset template may include a region which is divided by 352 on the first axis and divided by 34 on the second axis, and thus a total of 11,968 pixel values are arranged. Accordingly, the computing device 100 may calculate a total of 11,968 index values by calculating the index values of the preprocessed brainwave signal in units of 0.25 Hz for each of 34 ROIs and determine 11,968 pixel values in response to the calculated 11,968 index values. However, the present invention is not limited thereto, and the number of divisions of the first axis and the second axis may be variously set.

Figure 8A:
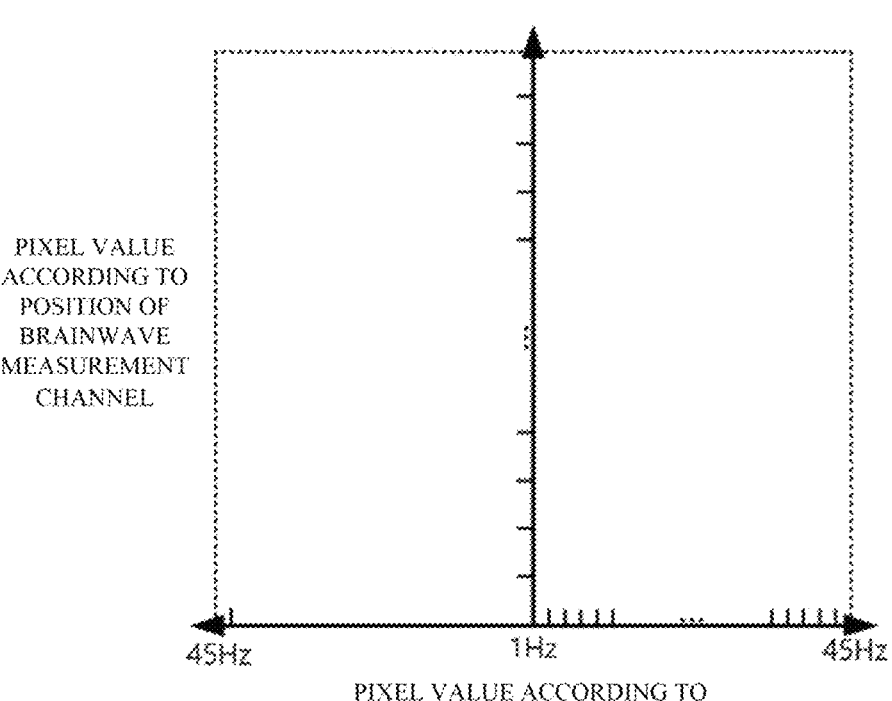

In addition, here, it is described that the second axis of the preset template is divided according to positions of 34 ROIs based on Desikan-Killiany atlas regions, but the present invention is not limited thereto. As illustrated in FIG. 8A, the second axis may be divided according to positions of 11 ROIs (for example, 11 positions (F3, C3, C4, P3, O1, T3, T4, T5, Fz, Cz, and Pz, among which Fz, Cz, Pz are positions where the left and right overlap) in each of the left and right regions based on the first axis) according to positions of a plurality of brainwave measurement channels attached to the first user's head.

In various embodiments, the computing device 100 may generate a plurality of unit sections by dividing each of left and right sides of the first axis for each frequency band according to the type of brainwave signals with respect to the central axis (1 Hz) set in the first axis. For example, the computing device 100 may divide each of the left 1 Hz to 45 Hz section and the right 1 Hz to 45 Hz section with respect to the central axis of the first axis into a total of 8 sections (for example, a delta section (a 1 to 4 Hz section), a theta section (a 4 to 8 Hz section), an alpha 1 section (an 8 to 10 Hz section), an alpha 2 section (a 10 to 12 Hz section), a beta 1 section (a 12 to 15 Hz section), a beta 2 section (a 15 to 20 Hz section), a beta 3 section (a 20 to 30 Hz section), and a gamma section (a 30 to 45 Hz section)) according to the type of brainwave signals.

In this case, the computing device 100 may divide the first axis so that a length of each unit section divided according to the type of the brainwave signals is the same regardless of the range of the frequency band.

Figure 9:
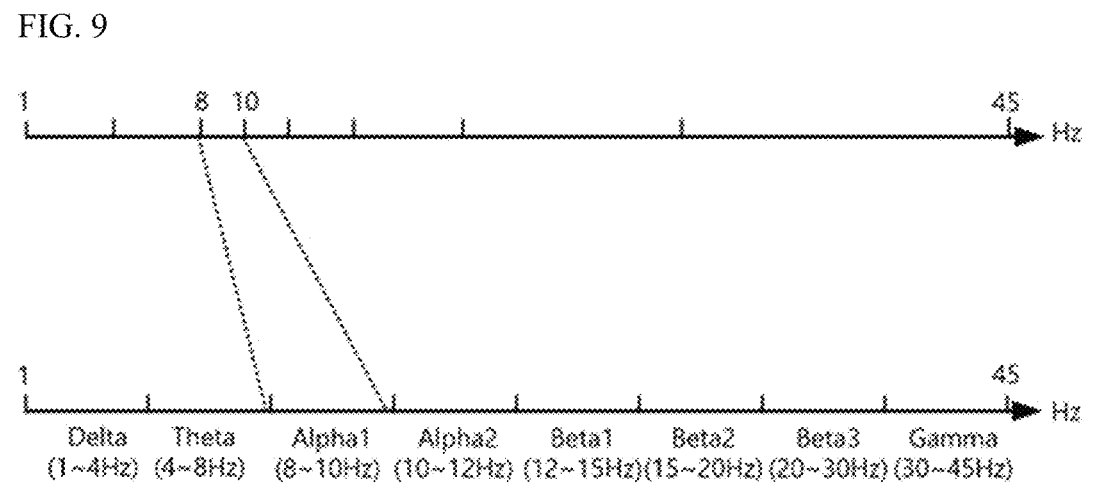

For example, as illustrated in FIG. 9, the delta section and the theta section have sections in the range of 3 Hz and 4 Hz, respectively, whereas the alpha 1 section and the alpha 2 section have sections in the range of 2 Hz, and thus pixel values may be arranged in a relatively narrow section compared with a delta wave and a theta wave. In other words, when the regions in which pixel values corresponding to respective brainwave signals are arranged are unbalanced, there is a problem in that the training and analysis effects may be reduced for brainwave signals arranged in relatively narrow sections such as the alpha 1 section or the alpha 2 section.

In consideration of this, the computing device 100 may divide the first axis to have the section of the same length for each frequency band regardless of the range of each frequency band. In this way, pixel values corresponding to a brainwave signal having a relatively narrow frequency band (for example, a brainwave signal having a frequency band within a range of 4 Hz) such as the alpha wave or the delta wave may be arranged in a relatively wide region, and pixel values corresponding to a brainwave signal having a relatively wide frequency band, such as the beta wave or the gamma wave, may be arranged in a relatively narrow region. For example, in the case of the alpha 1 wave, eight pixel values may be arranged in the first axis direction in the alpha 1 section having a first length, whereas in the case of the gamma wave, 60 pixel values may be arranged in the gamma section having the same first length as the alpha 1 section in the first axis direction.

In various embodiments, the computing device 100 may equally divide each of the left and right sides of the first axis for each frequency band according to the type of brainwave signals to generate a plurality of unit sections having the same length, but may equally adjust the length of the remaining unit sections by the length changed by adjusting the length of the specific section upon receiving a request from the second user to adjust the length of the specific section.

For example, when the computing device 100 receives a request from the second user to extend the length of the first unit section in order to more precisely observe the brainwave signal for the first unit section, the computing device 100 may extend the length of the first unit section by the size requested by the second user, and may equally shorten the lengths of the remaining unit sections by the extended length of the first unit section (for example, when the length of the first unit section is extended by 1, each of the remaining 7 unit sections may be shortened by $\frac{1}{7}$).

Also, when the computing device 100 receives a request from the second user to shorten the length of the second unit section as the importance of the second unit section is low, the computing device 100 may equally extend the length of the remaining unit sections by the shortened length of the second unit section (for example, when the length of the second unit section is shortened by 1, each of the remaining 7 unit sections is extended by ⅐).

In various embodiments, the computing device 100 may generate a plurality of unit sections by dividing each of the left and right sides of the first axis for each frequency band according to the type of brainwave signals with respect to the central axis (1 Hz) set in the first axis, determine the length of each of the plurality of unit sections based on the importance of each frequency band input by the second user, and divide the first axis according to the determined a length of each of the plurality of unit sections. For example, the computing device 100 may receive priorities (for example, 1 to 8 ranks) for each of the eight types of brainwave signals (for example, delta waves, theta waves, alpha 1 waves, alpha 2 waves, beta 1 waves, beta 2 waves, beta 3 waves, and gamma waves) based on the types of brainwave signals, and may divide the first axis so that a section having a high priority has a relatively larger length than a section having a low priority based on the set priority.

In operation S320, the computing device 100 may arrange a plurality of pixel values determined in response to each of the plurality of preprocessed brainwave signals on the preset template, and may perform image smoothing with pixel values arranged at mutually adjacent positions with respect to each of the plurality of pixel values.

For example, as illustrated in FIGS. 10A and 10B (which are diagrams illustrating an example process of performing image smoothing between pixel values), the computing device 100 may perform the image smoothing between pixel values arranged in the first region 10 and pixel values arranged in the second region 20 which is a position adjacent to the pixel value arranged in the first region 10, so that the pixel value arranged in the first region 10 and the pixel value arranged in the second region 20 may be continuous.

Here, as the method of performing the image smoothing between the pixel values arranged in the first region 10 and the pixel values arranged in the second region 20, the method of arranging an average value of the pixel values arranged in the first region 10 and the pixel values arranged in the second region 20 in a third region 30 which is a region where the pixel values arranged in the first region 10 and the pixel values arranged in the second region 20 contact each other may be applied, but is not limited thereto.

In addition, in order to derive a more continuous result, for the method of arranging the average value of the pixel values arranged in the first region 10 and the pixel values arranged in the second region 20 in the third region 30, the third region 30 may be subdivided into a plurality of third regions, and the average value may be sequentially reflected in the plurality of subdivided regions.

For example, the third region 30, which is the region where the pixel values arranged in the first region 10 and the pixel values arranged in the second region 20 are in contact with each other, may be divided into three third regions (for example, a 3-1 region, a 3-2 region, and a 3-3 region), and then a first average value which is the average of the pixel values arranged in the first region 10 and the pixel values arranged in the second region 20 may be arranged in the 3-2 region. In addition, a second average value, which is the average of the pixel values arranged in the first region 10 and the first average value, may be arranged in the region 3-1, and a third average value, which is the average of the first average value and the pixel values arranged in the second region 20, may be arranged in the 3-3 region.

In operation S330, the computing device 100 may perform the image resizing of changing the brainwave image created by arranging the plurality of pixel values on the preset template to a square having a preset size through operation S320 to create the standardized brainwave image (for example FIG. 11) (here, FIG. 11A illustrates the standardized brainwave image when the index value is the absolute power, and FIG. 11B illustrates the standardized brainwave image when the index value is the relative power).

Here, the preset size may be a value set by the second user, but is not limited thereto. In addition, the standardized brainwave image may be created in a square shape to improve the performance of the artificial intelligence model, but is not limited thereto, and various shapes may be applied.

Also, here, the image smoothing operation (operation S320) and the image resizing operation (operation S330) performed by the computing device 100 are described as each being sequentially performed, but the present invention is not limited thereto, and it is possible to perform the image smoothing while changing the brainwave image to the square through the image resizing.

In various embodiments, the computing device 100 may generate a pixel value matrix by using the plurality of pixel values determined to correspond to each of the plurality of preprocessed brainwave signals, and may create the standardized brainwave image using the pixel value matrix.

First, the computing device 100 may generate the pixel value matrix by using the plurality of pixel values determined to correspond to each of the plurality of preprocessed brainwave signals. For example, the computing device 100 arranges the pixel values (352 pieces) according to the change in frequency of the plurality of brainwave signals preprocessed in the row direction and arranges the pixel values (34 pieces) according to the change in position of the ROIs of the plurality of brainwave signals preprocessed in the column direction by considering that the first axis is divided by 0.25 Hz which is the preset unit frequency to form 352 regions and the second axis is divided according to the number of ROIs to form 34 regions, thereby generating the pixel value matrix of 352×34 pieces.

Thereafter, the computing device 100 may convert the pixel value matrix into a square matrix (for example, a matrix having the same number of rows and columns) based on the rows or columns of the 352×34 pixel value matrix in order to generate the standardized brainwave image in a square shape. In this case, it is preferable to convert based on an axis in which many pixel values are arranged among rows or columns of the pixel value matrix. For example, the computing device 100 may convert a 352×34 pixel value matrix into a 352×352 pixel value matrix based on the number of rows. In this case, the computing device 100 may perform the smoothing on the pixel values in the process of converting the 352×34 pixel value matrix into the 352×352 pixel value matrix (for example, operation S320).

Thereafter, the computing device 100 may create the standardized brainwave image in the square shape by arranging a 352×352 pixel matrix on the square template.

Figure 7B:
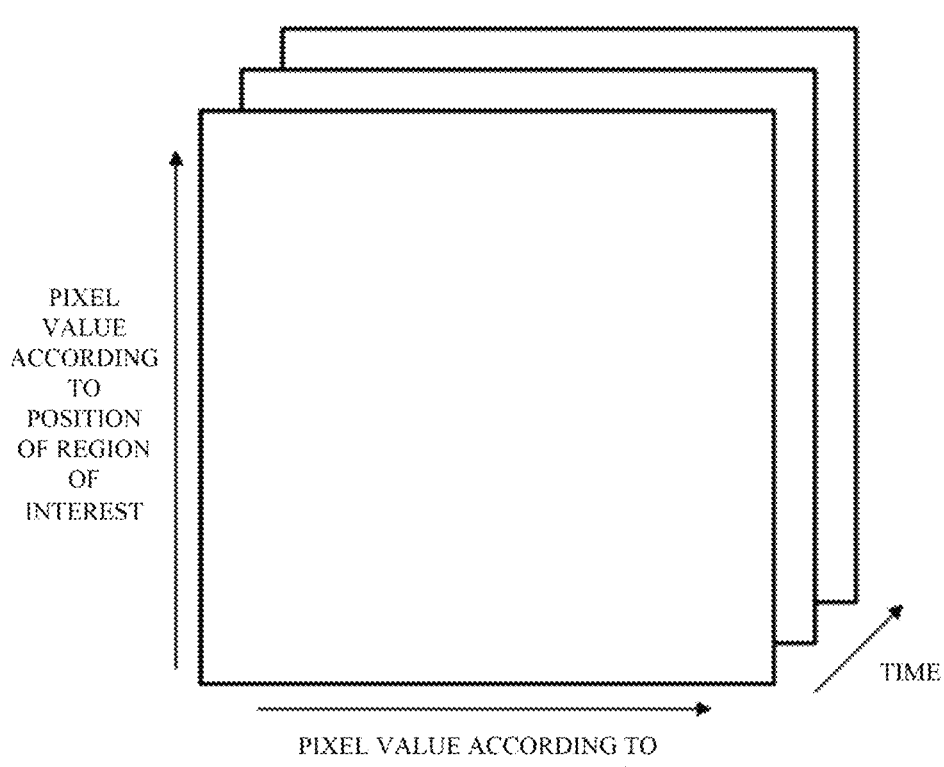
Figure 8B:
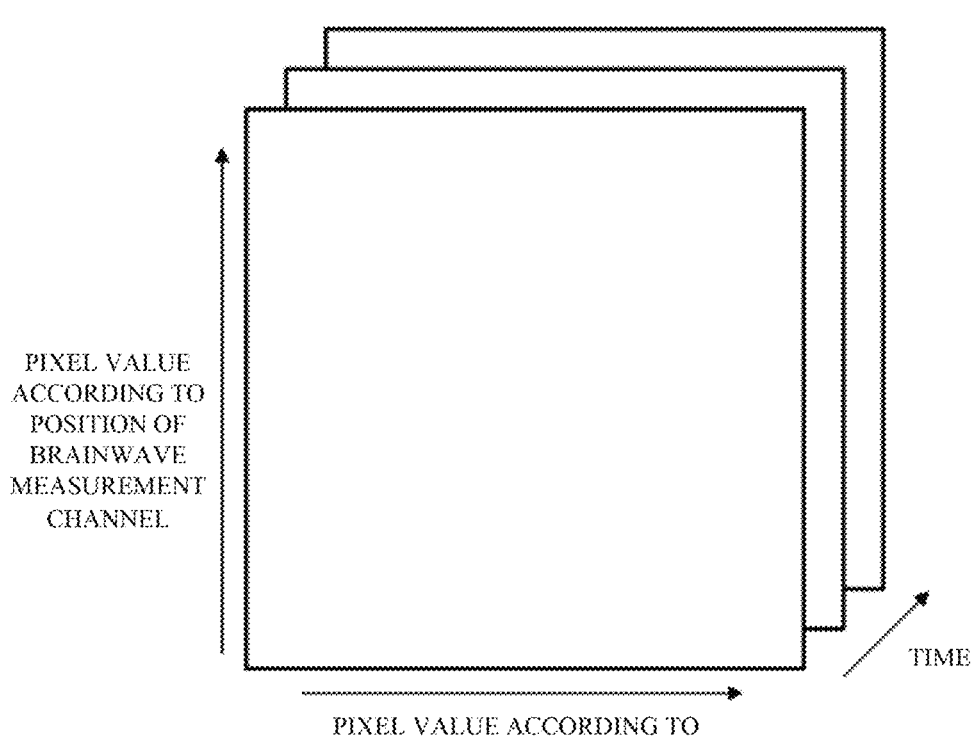

In various embodiments, as illustrated in FIGS. 7B and 8B, the computing device 100 may create the standardized brainwave image as a series for each time the brainwave signal is measured by using the preset template in which the first axis is the pixel value according to the change in frequency and the second axis is the pixel value according to the position of the point of interest or the pixel value according to the position of a brainwave measurement channel.

In operation S340, the computing device 100 may generate training data for training the artificial intelligence model by using the standardized brainwave image created through step S330.

In various embodiments, as illustrated in FIG. 12A, the computing device 100 may generate one piece of training data using one standardized brainwave image.

In various embodiments, as illustrated in FIG. 12B, the computing device 100 may generate one piece of training data by combining a plurality of standardized brainwave images in a square shape.

In this case, for the plurality of standardized brainwave images included in one piece of training data, it is possible to combine a plurality of standardized brainwave images created based on the same index value by combining a plurality of standardized brainwave images when the index value is the absolute power, combining a plurality of standardized brainwave images when the index value is the relative power, or the like, but the present invention is not limited thereto, and it is possible to generate one piece of training data by combining the standardized brainwave images when the index value is the absolute power, the standardized brainwave images when the index value is the relative power, the standardized brainwave images when the index value is the standard value, and the standardized brainwave images when the index value is the complexity or entropy, that is, combining the plurality of standardized brainwave images created by using different index values.

The above method of creating a standardized brainwave image for training an artificial intelligence model has been described with reference to the flowchart illustrated in the drawings. For simple description, the method of creating a standardized brainwave image for training an artificial intelligence model has been described with reference to a series of blocks, but the present invention is not limited to the order of the blocks, and some blocks may be performed in an order different from that illustrated and described herein, or may be performed concurrently. In addition, new blocks not described in the present specification and drawings may be added, or some blocks may be deleted or changed.

Figure 13:
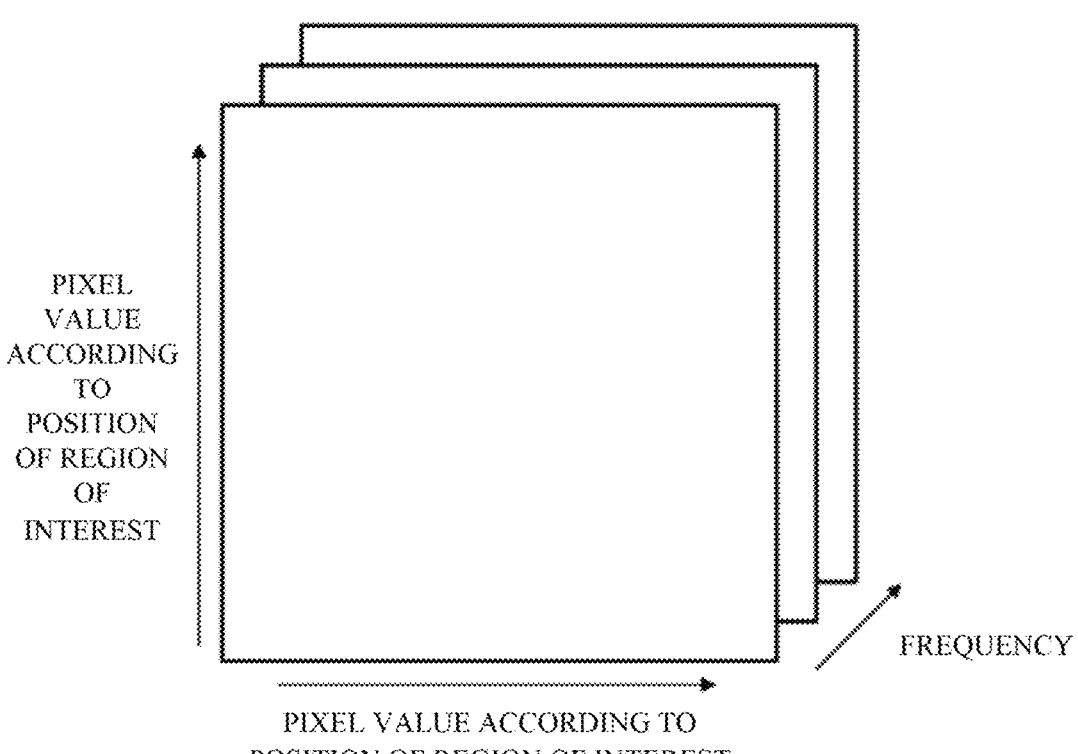
FIG. 13 is a diagram illustrating a standardized brainwave image series applicable to various embodiments.

In addition, in the method of creating a standardized brainwave image for training an artificial intelligence model according to various embodiments of the present invention, it has been described that the standardized brainwave images for training artificial intelligence models are created by arranging the pixel values according to the change in frequency on the first axis, and the pixel values according to the change in position (or the position of the brainwave measurement channel) of the user's ROI on the second axis, but the present invention is not limited thereto, and as illustrated in FIG. 13, the standardized brainwave images for training an artificial intelligence model may be created as a series for each frequency of the brainwave signals, and created by equally arranging the pixel values according to the change in positions of the ROIs of the user's brain (or pixel values according to the position of the brainwave measurement channel) on the first axis and the second axis.

According to various embodiments of the present invention, it is possible to compare brainwave signals collected through left and right channels by using only one standardized brainwave image, analyze brainwave signals in all frequency bands, and analyze the brainwave signals in consideration of importance of each frequency band by creating the standardized brainwave image using the plurality of brainwave signals collected from a user and training a machine-learning-based artificial intelligence model using the generated standardized brainwave image to improve performance (for example, accuracy, sensitivity, specificity, etc., of modeling) of the machine-learning-based artificial intelligence model for analyzing brainwaves.

The effects of the present invention are not limited to the above-described effects, and other effects that are not described may be obviously understood by those skilled in the art from the above detailed description.

Although exemplary embodiments of the present invention have been described with reference to the accompanying drawings, those skilled in the art to which the present invention belongs will appreciate that various modifications and alterations may be made without departing from the spirit or essential feature of the present invention. Therefore, it is to be understood that embodiments described hereinabove are illustrative rather than being restrictive in all aspects.

What is claimed is:

1. A method of creating a standardized brainwave image for training an artificial intelligence model executed by a computing device, the method comprising:

collecting a plurality of brainwave signals of a user in a plurality of frequency bands through a plurality of brainwave measurement channels, wherein the plurality of brainwave measurement channels are configured to be attached to a plurality of locations of a head of the user;

processing the plurality of collected brainwave signals;

creating a brainwave image using the plurality of processed brainwave signals; and performing training of an artificial intelligence (AI) model based on the brainwave image, and using the AI model to generate output data indicative of a state information of another user based on input of another user, wherein processing the plurality of collected brainwave signals includes:

calculating index values for the plurality of collected brainwave signals;

preprocessing the plurality of brainwave signals from which the index values are calculated, and filtering, among the plurality of brainwave signals from which the index values are calculated, a brainwave signal in a predetermined frequency band; and determining, based on the calculated index values, pixel values corresponding to the plurality of preprocessed brainwave signals respectively, wherein creating the brainwave image includes creating the brainwave image by using the determined pixel values, wherein creating the brainwave image by using the determined pixel values includes creating the brainwave image by arranging, in a preset template, the pixel values determined for the plurality of preprocessed brainwave signals respectively, wherein, in the preset template, pixel values according to a change in frequency are arranged on a first axis, and pixel values according to a change in position of a region of interest of a brain of the user are arranged on a second axis perpendicular to the first axis, wherein a preset reference frequency value is set as a central axis of the first axis, wherein pixel values corresponding to brainwave signals collected from a left region of the brain are arranged in a left region with respect to the central axis, and pixel values corresponding to brainwave signals collected from a right region of the brain are arranged in a right region with respect to the central axis, wherein creating the brainwave image by arranging the determined pixel values in the preset template includes:

dividing the first axis, wherein the dividing the first axis comprises:

generating a plurality of unit sections by dividing, based on frequency bands, a left side of the first axis with respect to the central axis, and further dividing, based on the frequency bands, a right side of the first axis with respect to the central axis, the frequency bands corresponding to types of the brainwave signals, wherein the plurality of unit sections have a same length regardless of a range of the frequency bands corresponding to the types of the brainwave signals, and wherein dividing the first axis includes:

based on a request to extend a length of a first unit section among the plurality of unit sections, extending the length of the first unit section, and shortening lengths of the remaining unit sections by the extended length of the first unit section, and based on a request to shorten a length of a second unit section among the plurality of unit sections, shortening the length of the second unit section, and extending the lengths of the remaining unit sections by the shortened length of the second unit section.

2. The method of claim 1, wherein processing the plurality of collected brainwave signals includes:

calculating index values for the plurality of collected brainwave signals;

preprocessing the plurality of brainwave signals from which the index values are calculated, and filtering, among the plurality of brainwave signals from which the index values are calculated, a brainwave signal in a predetermined frequency band; and determining, based on the calculated index values, pixel values corresponding to the plurality of preprocessed brainwave signals respectively.

3. The method of claim 2, wherein calculating the index values includes:

calculating the index values using at least one of absolute power, relative power, a standard value (Z-score), complexity, and entropy of the plurality of preprocessed brainwave signals, respectively.

4. The method of claim 1, wherein creating the brainwave image by arranging the determined pixel values in the preset template includes:

generating a plurality of unit sections by dividing the first axis based on frequency bands, the frequency bands corresponding to types of the brainwave signals, and determining a length of each of the plurality of unit sections based on importance of each of the frequency bands, the importance being input by a user.

5. The method of claim 1, wherein creating the brainwave image by arranging the determined pixel values in the preset template includes:

generating a pixel value matrix using the plurality of pixel values determined to correspond to the plurality of preprocessed brainwave signals respectively, the generated pixel value matrix having (i) pixel values being arranged in a row direction according to a change in frequency of the plurality of preprocessed brainwave signals and (ii) pixel values being arranged in a column direction according to a change in position of a region of interest of the plurality of preprocessed brainwave signals;

converting the generated pixel value matrix into a square matrix; and arranging the square matrix in the preset template to generate the standardized brainwave image.

6. The method of claim 1, wherein creating the brainwave image by arranging the determined pixel values in the preset template includes:

arranging the plurality of pixel values, determined to correspond to the plurality of preprocessed brainwave signals, in a region that corresponds to a frequency and a position of a point of interest of each of the plurality of preprocessed brainwave signals on the preset template, and performing image smoothing on pixel values arranged adjacent to the plurality of pixel values; and creating the standardized brainwave image by performing image resizing that converts the image-smoothed brainwave image to a square having four sides of equal length.

7. The method of claim 6, further comprising:

generating training data for training the artificial intelligence model by using the created standardized brainwave image, wherein the generated training data includes one standardized brainwave image or a plurality of standardized brainwave images combined in a square having four side of equal length.

8. An apparatus for creating a standardized brainwave image for training an artificial intelligence model, the apparatus comprising:

a processor, a memory; and a computer program loaded into the memory and executed by the processor to cause the apparatus to perform operations comprising:

collecting a plurality of brainwave signals of a user in a plurality of frequency bands through a plurality of brainwave measurement channels, wherein the plurality of brainwave measurement channels are configured to be attached to a plurality of locations of a head of the user;

processing the plurality of collected brainwave signals;

creating a brainwave image using the plurality of processed brainwave signals; and performing training of an artificial intelligence (AI) model based on the brainwave image, and using the AI model to generate output data indicative of a state information of another user based on input of another user, wherein processing the plurality of collected brainwave signals includes:

calculating index values for the plurality of collected brainwave signals, preprocessing the plurality of brainwave signals from which the index values are calculated, and filtering, among the plurality of brainwave signals from which the index values are calculated, a brainwave signal in a predetermined frequency band, and determining, based on the calculated index values, pixel values corresponding to the plurality of preprocessed brainwave signals respectively, wherein creating the brainwave image includes creating the brainwave image by using the determined pixel values, wherein creating the brainwave image by using the determined pixel values includes creating the brainwave image by arranging, in a preset template, the pixel values determined for the plurality of preprocessed brainwave signals respectively, and wherein, in the preset template, pixel values according to a change in frequency are arranged on a first axis, and pixel values according to a change in position of a region of interest of a brain of the user are arranged on a second axis perpendicular to the first axis, wherein a preset reference frequency value is set as a central axis of the first axis, wherein pixel values corresponding to brainwave signals collected from a left region of the brain are arranged in a left region with respect to the central axis, and pixel values corresponding to brainwave signals collected from a right region of the brain are arranged in a right region with respect to the central axis, wherein creating the brainwave image by arranging the determined pixel values in the preset template includes:

dividing the first axis, wherein the dividing the first axis comprises:

generating a plurality of unit sections by dividing, based on frequency bands, a left side of the first axis with respect to the central axis, and further dividing, based on the frequency bands, a right side of the first axis with respect to the central axis, the frequency bands corresponding to types of the brainwave signals, wherein the plurality of unit sections have a same length regardless of a range of the frequency bands corresponding to the types of the brainwave signals, and wherein dividing the first axis includes:

based on a request to extend a length of a first unit section among the plurality of unit sections, extending the length of the first unit section, and shortening lengths of the remaining unit sections by the extended length of the first unit section, and based on a request to shorten a length of a second unit section among the plurality of unit sections, shortening the length of the second unit section, and extending the lengths of the remaining unit sections by the shortened length of the second unit section.

9. A non-transitory computer-readable medium having stored therein a computer program for causing a computing device to execute a process of creating a standardized brainwave image for training an artificial intelligence model, the process comprising:

collecting a plurality of brainwave signals of a user in a plurality of frequency bands through a plurality of brainwave measurement channels, wherein the plurality of brainwave measurement channels are configured to be attached to a plurality of locations of a head of the user;

processing the plurality of collected brainwave signals;

creating a brainwave image using the plurality of processed brainwave signals; and performing training of an artificial intelligence (AI) model based on the brainwave image, and using the AI model to generate output data indicative of a state information of another user based on input of another user, wherein processing the plurality of collected brainwave signals includes:

calculating index values for the plurality of collected brainwave signals, preprocessing the plurality of brainwave signals from which the index values are calculated, and filtering, among the plurality of brainwave signals from which the index values are calculated, a brainwave signal in a predetermined frequency band, and determining, based on the calculated index values, pixel values corresponding to the plurality of preprocessed brainwave signals respectively, wherein creating the brainwave image includes creating the brainwave image by using the determined pixel values, wherein creating the brainwave image by using the determined pixel values includes creating the brainwave image by arranging, in a preset template, the pixel values determined for the plurality of preprocessed brainwave signals respectively, and wherein, in the preset template, pixel values according to a change in frequency are arranged on a first axis, and pixel values according to a change in position of a region of interest of a brain of the user are arranged on a second axis perpendicular to the first axis, wherein a preset reference frequency value is set as a central axis of the first axis, wherein pixel values corresponding to brainwave signals collected from a left region of the brain are arranged in a left region with respect to the central axis, and pixel values corresponding to brainwave signals collected from a right region of the brain are arranged in a right region with respect to the central axis, wherein creating the brainwave image by arranging the determined pixel values in the preset template includes:

dividing the first axis, wherein the dividing the first axis comprises:

generating a plurality of unit sections by dividing, based on frequency bands, a left side of the first axis with respect to the central axis, and further dividing, based on the frequency bands, a right side of the first axis with respect to the central axis, the frequency bands corresponding to types of the brainwave signals, wherein the plurality of unit sections have a same length regardless of a range of the frequency bands corresponding to the types of the brainwave signals, and wherein dividing the first axis includes:

based on a request to extend a length of a first unit section among the plurality of unit sections, extending the length of the first unit section, and shortening lengths of the remaining unit sections by the extended length of the first unit section, and based on a request to shorten a length of a second unit section among the plurality of unit sections, shortening the length of the second unit section, and extending the lengths of the remaining unit sections by the shortened length of the second unit section.

* * * * *